United States Patent
Phonthammachai et al.

(10) Patent No.: US 9,267,029 B2
(45) Date of Patent: Feb. 23, 2016

(54) NANO-COMPOSITE

(75) Inventors: Nopphawan Phonthammachai, Singapore (SG); Chaobin He, Singapore (SG); Xu Li, Singapore (SG); Hong Ling Chia, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 653 days.

(21) Appl. No.: 13/575,755

(22) PCT Filed: Jan. 27, 2011

(86) PCT No.: PCT/SG2011/000037
§ 371 (c)(1),
(2), (4) Date: Jul. 27, 2012

(87) PCT Pub. No.: WO2011/093799
PCT Pub. Date: Aug. 4, 2011

(65) Prior Publication Data
US 2013/0005856 A1  Jan. 3, 2013

Related U.S. Application Data

(60) Provisional application No. 61/299,210, filed on Jan. 28, 2010.

(51) Int. Cl.
| | |
|---|---|
| *C08K 9/06* | (2006.01) |
| *C08K 3/36* | (2006.01) |
| *C08L 63/00* | (2006.01) |
| *C09C 1/30* | (2006.01) |
| *B82Y 30/00* | (2011.01) |
| *C08K 5/544* | (2006.01) |

(52) U.S. Cl.
CPC .............. *C08L 63/00* (2013.01); *B82Y 30/00* (2013.01); *C09C 1/3081* (2013.01); *C01P 2004/62* (2013.01); *C01P 2004/64* (2013.01); *C08K 3/36* (2013.01); *C08K 5/544* (2013.01); *C08K 9/06* (2013.01); *C08K 2201/011* (2013.01)

(58) Field of Classification Search
CPC .................................. C08K 9/06; C08K 3/36
USPC ....................................................... 523/443
See application file for complete search history.

(56) References Cited

U.S. PATENT DOCUMENTS

| | | | |
|---|---|---|---|
| 4,522,958 A | 6/1985 | Das et al. | |
| 5,019,607 A * | 5/1991 | Coltrain et al. | 523/435 |
| 5,648,407 A | 7/1997 | Goetz et al. | |
| 2003/0099844 A1 * | 5/2003 | Hanahata et al. | 428/447 |
| 2004/0096672 A1 * | 5/2004 | Lukas et al. | 428/446 |
| 2005/0082691 A1 | 4/2005 | Ito et al. | |
| 2007/0041700 A1 * | 2/2007 | Makino et al. | 385/141 |
| 2007/0046865 A1 * | 3/2007 | Umeda et al. | 349/96 |
| 2008/0188581 A1 * | 8/2008 | Lee et al. | 521/154 |
| 2010/0305237 A1 | 12/2010 | Suemura et al. | |

FOREIGN PATENT DOCUMENTS

| | | |
|---|---|---|
| CN | 1436815 A | 8/2003 |
| CN | 1621482 A | 6/2005 |
| CN | 101195487 A | 6/2008 |
| CN | 101338082 A | 1/2009 |
| EP | 0370586 A2 | 5/1990 |
| KR | 100894401 B1 | 4/2009 |
| WO | WO2009069429 | 6/2009 |

OTHER PUBLICATIONS

Chang et al., "Thermally and Mechanically Enhanced Epoxy Resin-Silica Hybrid Materials Containing Primary amine-Modified Silica Nanoparticles," *Journal of Applied Polymer Science*, 108: 1629-1635, 2008.
Chattopadhyay, D., "Organic-inorganic hybrid coatings prepared from glycidyl carbamate resin, 3-aminopropyl trimethoxy silane and tetraethoxyorthosilicate," *Progress in Organic Coatings*, 64: 128-137, 2009.
International Preliminary Report on Patentability for PCT/SG11/000037; 24 pages (2012).
International Search Report for PCT/SG11/000037; 5 pages (2011).
Sun et al., "Study on mono-dispersed nano-size silica by surface modification for underfill applications," *Journal of Colloid and Interface Science*, 292: 436-444, 2005.
Wu et al., "Preparation of Epoxy/Silica and Epoxy/Titania Hybrid Resists via a Sol-Gel Process for Nanoimprint Lithography," *Journal of Physical Chemistry C*, 114: 2179-2183, 2010.

\* cited by examiner

*Primary Examiner* — Megan McCulley
(74) *Attorney, Agent, or Firm* — Choate, Hall & Stewart LLP; Charles E. Lyon

(57) ABSTRACT

There is provided a method of making a nano-composite having individual nano-sized silica particles dispersed in a polymer matrix, the method comprises the step of curing a substantially homogeneous mixture of surface-functionalized nano-sized silica particles, a polymerizable resin and a curing agent, wherein said substantially homogeneous mixture is substantially free of alcoholic solvent to form the nano-composite.

19 Claims, 2 Drawing Sheets

NANO-COMPOSITE

TECHNICAL FIELD

The present invention generally relates to a nano-composite and more particularly to a method for manufacture of the same.

BACKGROUND

Epoxy-based nano-composites are known to have properties that are superior over neat epoxy, which is a brittle resin with poor resistance to crack initiation.

Toughening strategies have included the incorporation of filler particles using such materials as rubber particles, core-shell particles, hydro-branched polymer particles, thermoplastic particles and inorganic particles. The selection of filler particles has an impact on the nano-composites mechanical properties, such as strength, modulus and, especially in the case of epoxy-based nano-composites, their thermal stability.

Inorganic filler particles are commonly used modifiers for nano-composite production because of their ability to improve toughness while maintaining high modulus and thermal stability. The volume fraction, dispersion, size, type and surface functionalization of inorganic fillers play important roles in the mechanical reinforcement of the polymer. The properties of composites can be significantly improved when micron-sized fillers are replaced by nano-sized fillers, due to the reduction in the inter-particle distances. This is because stress transfer from matrix to filler, suppression of polymer chain mobility and the amount of energy dissipation at crack initiation and propagation can be promoted by the presence of mechanically coupled networks at low inter-particle distance.

Sol-gel silica, which has low thermal expansion, uniform morphology and particle size, is a known nano-filler for nano-composite preparation. The extent of silica nanoparticles dispersion within an epoxy matrix and the interfacial interaction between the silica nanoparticles and the epoxy matrix are important parameters affecting properties of the silica-epoxy nanocomposite formed. Currently known methods attempt to improve interfacial interaction between silica nanoparticles and epoxy matrix through functionalization of silica surfaces by amine-terminated coupling agent prior to dispersion into the epoxy resin. One major disadvantage of using such sol-gel route in nanocomposite preparation is the use of solvent in the preparation process. The solvent needs to be removed and recycled or disposed of, thus posing environmental, health and safety issues, in addition to the additional costs involved in solvent removal or disposal. As a result of the high production costs due to complexity of the manufacturing process, silica nanocomposite derived from the sol-gel process is particularly limited to high tech applications, such as aerospace, automotive and electronics.

In situ sol-gel silica/epoxy preparation methods have also been developed to simplify the preparation of nanocomposites. Such methods include in situ sol-gel synthesis of silicon alkoxide under vacuum or elevated temperature. Although the process of silica/epoxy nanocomposite production has been simplified through the combination of silica formation step with nanocomposite preparation, this method is not widely adopted in industry because of the non-uniformity of silica nanoparticles produced, poor silica dispersion and weak interfacial interaction between the silica and epoxy matrix. In addition, a solvent is still required in this process as a diluent and therefore issues regarding solvent removal or disposal remain relevant.

For both sol-gel and in situ sol-gel methods, very high silica content (6-30% by weight) in silica/epoxy nanocomposite is required to achieve high mechanical and thermal properties. Preparation of composites with lower degrees of silica content, while still maintaining its mechanical and thermal properties, is required for reduction of processing cost, because these silica sources (sol-gel silica, concentrated silica/epoxy resin, colloidal silica) are expensive.

For industrial-scale applications, resin transfer molding (RTM), resin infusion molding (RIM) and vacuum bagging processes are widely used. The these processes require that the nanocomposites be easily and completely fed into cavities of designed mold shape before curing. As such, high performance composites with low viscosity are preferred. However, viscosities of materials with very high silica content (6-30% by weight) are desired for their mechanical and thermal properties, thereby posing difficulties during processing, limiting their usage in industrial-scale applications.

Another method of forming a silica-epoxy nanocomposite requires the use of hexahydrophthalic anhydride in a mixture of diglycidyl ethers of bisphenol-A and tetraethoxysilane. In this process, the tetraethoxysilane has to go through a two step modification in order to form the silica nanoparticles, which tend to be spherical in shape. Further, this method requires the use of an autoclave to increase the temperature to 170° C., which is not cost-efficient.

Therefore, there is a need for a method for preparing a nanocomposite that overcomes, or at least ameliorates one or more of the disadvantages described above.

There is also a need to provide a method of producing a silica/epoxy nanocomposite that possesses superior properties, such as improved mechanical and thermal properties over neat epoxy and which can be produced on an industrial scale.

SUMMARY

According to a first aspect, there is provided a method of making a nano-composite having individual nano-sized silica particles dispersed in a polymer matrix, the method comprises, in a reaction zone, providing a substantially homogeneous mixture being comprised of: silica precursors; a polymerizable resin; a coupling agent having functional groups; and an alkaline catalyst; and hydrolyzing and condensing said silica precursors in said homogeneous mixture, wherein the alkaline catalyst is selected to initiate hydrolysis and condensation of the silica precursors to form the silica particles while simultaneously functionalizing the formed silica particles with the functional groups of the coupling agent, said hydrolyzing, condensing and functionalizing being undertaken under shear conditions and in the absence of an alcoholic solvent in said homogeneous mixture to form individual nano-sized silica particles dispersed in said polymerizable resin According to an embodiment, there is provided a method of making a nano-composite having individual nano-sized silica particles dispersed in a polymer matrix, the method comprises the step of curing a substantially homogeneous mixture of surface-functionalized nano-sized silica particles, a polymerizable resin and a curing agent, wherein said substantially homogeneous mixture is substantially free of alcoholic solvent to form the nano-composite.

Advantageously, the disclosed method enables the nano-composite to be made in a single step (ie "one-pot" manufacturing step), advantageously without additional steps such as a solvent removal step or additional silica modification steps. More advantageously, the homogeneous mixture is substantially free of a solvent, except perhaps for incidental solvent for an alkaline catalyst. Accordingly the disclosed method may be a "solvent-less" synthesis of the nano-composite. Advantageously, this means that in the manufacture of the nano-composite, it is not necessary to have a separate solvent removal step before, during or after the curing step, which is particularly advantageous when the method is performed on an industrial scale. In particular, the presence of the catalyst may aid in forming and functionalizing the nano-sized silica particles in one step.

Advantageously, the disclosed method may not require the use of organic solvents such as alcohol and ketone to disperse the nano-sized silica particles. Hence, the problems of removal and disposal of the alcoholic solvents are eliminated.

According to a second aspect, there is provided a nano-composite comprising nano-sized silica particles dispersed in a polymer matrix made according to the method as defined above, wherein the silica particles are substantially elongate. The aspect ratio of the nano-sized silica particles may be greater than 1 and the nano-sized silica particles may be present in the nano-composite in an amount less than 6% by weight of the nano-composite.

DEFINITIONS

The following words and terms used herein shall have the meaning indicated:

The term "nano-composite" is used herein to mean a composition of nano-sized silica particles dispersed within a polymer matrix.

The term "polymer matrix" as used herein and in the context of the "nano-composite" disclosed herein, is applied to a continuous phase (the matrix) which is polymeric and another phase (the silica particles) which has at least one long dimension. The nano-sized silica particles may be wholly and/or partially encapsulated within the polymeric matrix.

The term "nano-sized silica particles", as used herein relates to the maximum average dimension of silica particles having a size of less than about 1000 nm, particularly less than about 500 nm, more particularly between about 10 nm to about 500 nm. In one embodiment, the nano-sized silica particles have an generally elongate shape and the maximum dimension is the length dimension of the particles.

The term "substantially homogeneous mixture" shall be interpreted to mean a mixture approaching uniform composition throughout.

The term "silica particles" as used herein refers to a plurality of discrete particles of oxide of silicon having the approximate chemical formula $SiO_2$, without regard to shape, morphology, porosity, and water or hydroxyl content.

The term "surface aminated" when referring to nano-sized silica particles, denotes any nano-sized silica particles having coupled to its surface at least one group chosen from primary amines, secondary amines, tertiary amines, and quaternary ammonium groups.

The nano-sized silica particles may be "monodispersed" in the nano-composite by not substantially agglomerating or clumping together with other nanoparticles.

The term "solvent", as used herein, refers to a liquid which is used to partially or completely dissolve or disperse a compound at a given concentration such that a solution or dispersion is formed respectively. In one embodiment, the solvent may refer to an alcoholic solvent.

Accordingly, the phrase "substantially free of a solvent" or the term "solvent-less", when referring to the homogeneous mixture, means that the bulk of the homogeneous mixture has not been dissolved or dispersed in a solvent. However, the homogeneous mixture may still contain incidental solvent such as water for an alkaline catalyst. In the event that a solvent be present in the homogeneous mixture due to contamination of the homogeneous mixture, the amount of solvent should be less than about 0.5 wt %, less than about 0.1 wt %, or less than about 0.01 wt %.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and subgeneric groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Exemplary, non-limiting embodiments of a method of making a nano-composite having individual nano-sized silica particles dispersed in a polymer matrix will now be disclosed. The method of making a nano-composite having individual nano-sized silica particles dispersed in a polymer matrix comprises the step of curing a substantially homogeneous mixture of surface-functionalized nano-sized silica particles, a polymerizable resin and a curing agent, wherein said substantially homogeneous mixture is substantially free of alcoholic solvent to form the nano-composite.

The method may comprise the step of functionalizing the nano-sized silica particles by coupling amine groups to the nano-sized silica particles. In one embodiment, the may comprise the step of functionalizing the nano-sized silica particles by coupling epoxide groups to the nano-sized silica particles.

The coupling agent may be an organosilane compound that has undergone hydrolysis. Hence, the hydrolyzed organosilane compound may have a hydroxyl functional group to participate in a condensation reaction with hydrolyzed nano-sized silica particles to form the surface-functionalized nano-sized silica particles and another functional group that can react with the matrix. For example, the functional group that can react with the matrix may be an amine group. Hence, the hydrolyzed organosilane compound may comprise an amine group. In another embodiment, the functional group that can react with the matrix may be an epoxide group. Hence, the hydrolyzed organosilane compound may comprise an epoxide group.

The hydrolyzed organosilane coupling agent may be derived from an organosilane coupling agent having the above functional group that can react with the matrix as well as a functional group that can undergo hydrolysis to form the hydroxyl functional group. The functional group that can undergo hydrolysis may be an alkoxy functional group. Hence, the organo-silane coupling agent may have amine functional groups and alkoxy functional groups.

The organo-silane coupling agent may be selected from the group consisting of epoxysilane, mercaptosilane, alkylsilane, phenylsilane, ureidosilane and vinylsilane, titanium based compounds, aluminum chelates, and aluminum/zirconium based compounds.

Exemplary organo-silane coupling agents include silane coupling agents such as β-(3,4-epoxycyclohexyl)ethyltrimethoxysilane, γ-glycidoxypropyltrimethoxysilane, 3-glycidoxypropylmethyldimethoxysilane, γ-mercaptopropyltrimethoxysilane, aminopropyltrimethoxysilane, γ-aminopropylmethyldimethoxysilane, γ-aminopropyltriethoxysilane, γ-aminopropylmethyldiethoxysilane, γ-(N,N-dimethyl)aminopropyltrimethoxysilane, γ-(N,N-diethyl)aminopropyltrimethoxysilane, γ-(N,N-dibutyl)aminopropyltrimethoxysilane, γ-(N-methyl)anilinopropyltrimethoxysilane, γ-(N-ethyl)anilinopropyltrimethoxysilane, γ-(N,N-dimethyl)aminopropyltriethoxysilane, γ-(N,N-diethyl)aminopropyltriethoxysilane, γ-(N,N-dibutyl)aminopropyltriethoxysilane, γ-(N-methyl)aminopropyltriethoxysilane, γ-(N-ethyl)aminopropyltriethoxysilane, γ-(N,N-dimethyl)aminopropylmethyldimethoxysilane, γ-(N,N-diethyl)aminopropylmethyldimethoxysilane, γ-(N,N-dibutyl)aminopropylmethyldimethoxysilane, γ-(N-methyl)aminopropylmethyldimethoxysilane, γ-(N-ethyl)amiopropylmethyldimethoxysilane, N-(trimethoxysilylpropyl)ethylenediamine, N-(dimethoxymethylsilylisopropyl)ethylenediamine, γ-mercaptopropylmethyldimethoxysilane; titanate coupling agents such as isopropyltri(N-aminoethyl-aminoethyl)titanate. These may be used alone or in combination of two or more thereof.

In one embodiment, the organo-silane coupling agent is an organosilane compound having the formula $(Y-R)_nSiX_m$, where Y is a chemical moiety capable of chemically reacting with the functional group of the matrix, R is a $C_{3-6}$-alkyl group, X is a $C_{1-6}$-alkoxy group, and n and m are integers such that the sum of n and m is 4 (n+m=4). Y may be an amine group. Accordingly, the coupling agent may be aminopropyltrimethoxysilane (APTMS) having the formula (I) below:

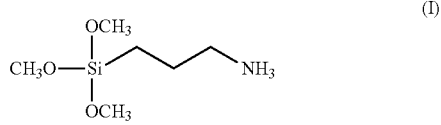

(I)

In another embodiment, the organosilane coupling agent may be 3-glycidoxypropyltrimethoxysilane.

The weight ratio of the organo-silane coupling agent to silica may be in the range of 0.0001:1.0 to 0.5:1.0.

The method may comprise the step of providing hydroxyl groups on the surface of nano-sized silica particles that are capable of condensing with the hydroxyl functional groups of the organo-silane coupling agent. The method may comprise the step of providing an alkaline catalyst to the substantially homogeneous mixture to aid in the condensation reaction between the hydrolyzed nano-sized silica particles and hydrolyzed organo-silane coupling agent.

The method may comprise the step of condensing silicon hydroxide molecules to thereby form the hydrolyzed nano-sized silica particles. The method may comprise the step of providing an alkaline catalyst to aid in the formation of the hydrolyzed nano-sized silica particles.

The method may comprise the step of providing silica precursors to the substantially homogeneous mixture. The silica precursor may then undergo a hydrolysis reaction to form silicon hydroxide. Hence, in one embodiment of the disclosed method, the silicon hydroxide molecules may be derived from hydrolyzing silica precursors that are provided to the substantially homogeneous mixture. The water for the hydrolysis reaction is extracted from the alkaline catalyst solution.

As mentioned above, the silicon hydroxide molecules then undergo a condensation reaction in the presence of the alkaline catalyst to form the hydrolyzed nano-sized silica particles. The silica precursor may comprise silicon alkoxide. The silicon alkoxide may be of the following formula $Si(OR)_n$, in which R is an $C_{1-6}$alkyl group and n is either 3 or 4. When n is 3, the silicon alkoxide is a trialkoxysilane and may be selected from the group consisting of trimethoxysilane, triethoxysilane, tripropoxysilane, tributoxysilane, tripentoxysilane and trihexoxysilane. When n is 4, the silicon alkoxide is a tetraalkoxysilane and may be selected from the group consisting of, tetramethoxysilane, tetraethoxysilane (or commonly known as tetraethyl orthosilicate, TEOS), tetrapropoxysilane, tetrabutoxysilane, tetrapentoxysilane and tetrahexoxysilane. In one embodiment, the silicon alkoxide is TEOS, having the structure (II) below:

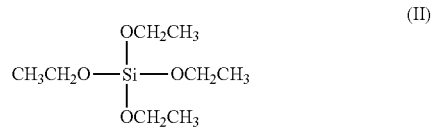

(II)

The weight ratio of the silica precursor to catalyst is from 5.7:1 to 7.7:1. If the amount of catalyst added is below the volume ratio as mentioned above of 5.7:1, the nano-sized silica particle may not be formed completely from the silica precursor. On the other hand, if the amount of catalyst added is greater than the volume ratio as mentioned above of 7.7:1, the coupling agent would also form the nano-sized silica particles, which is undesirable.

The alkaline catalyst may contain an ammonium cation (when in the presence of water molecules). Hence, the catalyst may be selected from the group consisting of ammonia, ammonium hydroxide and alkylamine such as methylamine and ethylamine The catalyst may be capable of catalyzing the hydrolysis of silicon hydroxide to form the hydrolyzed nano-sized silica particles while, at the same time, catalyze the condensation reaction between the hydrolyzed nano-sized silica particles and hydrolyzed organo-silane coupling agent to form a surface-functionalized nano-sized silica particles. The surface functionality of the nano-sized silica particles may aid in promoting dispersion of the nano-sized silica particle in the matrix.

In one embodiment, the solvent-free mechanism for the in-situ sol-gel process of making the surface-functionalized nano-sized silica particles is shown below:

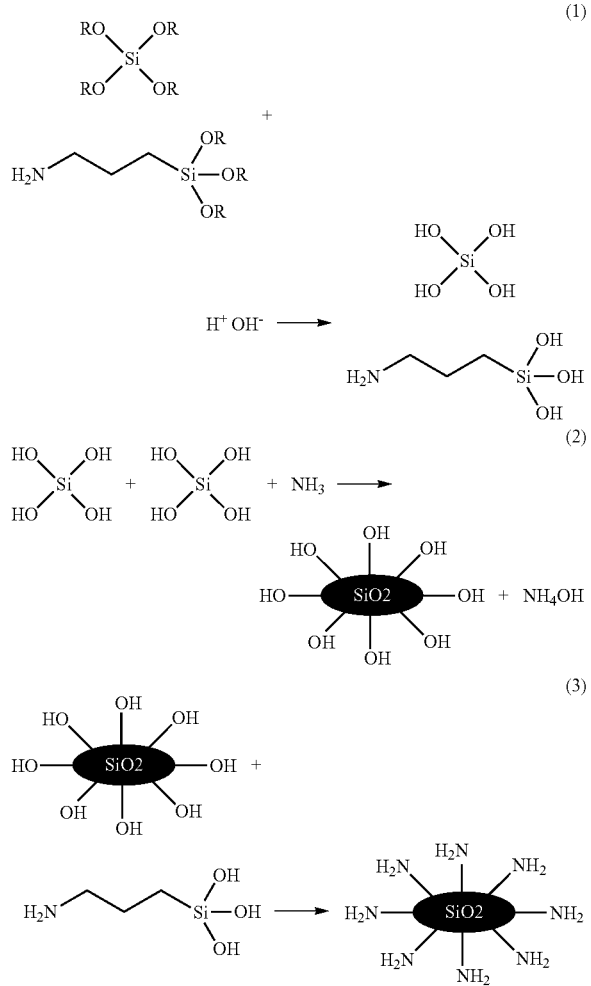

From Scheme 1, a silica precursor such as TEOS and an organo-silane coupling agent such as APTMS are hydrolyzed by hydroxyl groups of $H_2O$ that come from an ammonia solution to form silicon hydroxide and hydrolyzed APTMS, respectively (step 1). It is to be noted that the water molecules do not serve as a solvent in the homogeneous mixture, but are present in the reaction scheme as one of the reactants for the solvent-free sol-gel process. After that, the hydrolyzed nano-sized silica particles are formed via condensation reaction of silicon hydroxide molecules in the presence of the ammonia catalyst solution. The hydrolyzed nano-sized silica particles undergo nucleation and growth to form oval-shaped hydrolyzed nano-sized silica particles (as seen in step 2). The hydrolyzed APTMS molecules and hydrolyzed nano-sized silica particles then undergo a condensation reaction in the presence of the ammonia catalyst solution to form surface-functionalized nano-sized silica particles such as surface-aminated nano-sized silica particles (step 3). In this condensation step, the $NH_3$ molecules act as a catalyst to accelerate the condensation of hydrolyzed TEOS and APTMS. These $NH_3$ molecules are recovered back after the condensation reaction because it serves as a catalyst.

In the disclosed process, if the ammonia solution is not present, the nano-sized silica particles would not be formed because the water molecules ($H_2O$) and alkaline catalyst ($NH_3$ molecules) are requisite components for the solvent-free sol-gel process of silica. In the absence of $NH_3$ molecules (that is, only water is present), the nucleation and growth mechanisms of the hydrolyzed nano-sized silica particles will be affected, resulting in non-homogeneous silica dispersion, large aggregation of silica and non-uniform morphology of silica particles in epoxy resin. Therefore, $NH_3$ molecules may be necessary in order to achieve elongated nano-sized silica particles that are uniformly dispersed and have a substantially uniform morphology in the epoxy resin.

The nano-sized silica particles may be dispersed in the nano-composite as discrete, individual particles. The nano-sized silica particles may be functionalized by introducing amine or epoxide groups on the surface of the nano-sized silica particles. The amine or epoxide groups on the nano-sized silica particles may cross-linked with the polymer matrix. The presence of the amine or epoxide groups on the nano-sized silica particles may promote the dispersion of the nano-sized silica particles in the polymer matrix due to the substantially stronger bonding force created between the nano-sized silica particles and the polymer matrix. Due to the cross-linking bonds created between the nano-sized silica particles and the polymer matrix, the stability of the nano-sized silica particles in the polymer matrix may be substantially increased as compared to a nano-composite in which the surfaces of the nano-sized silica particles are not functionalized.

The average particle size of the nano-sized silica particles may be less than 1000 nm and more preferably selected from the range consisting of about 10 nm to about 500 nm, about 50 nm to about 500 nm, about 100 nm to about 500 nm, about 150 nm to about 500 nm, about 200 nm to about 500 nm, about 250 nm to about 500 nm, about 300 nm to about 500 nm, about 350 nm to about 500 nm, about 400 nm to about 500 nm, about 450 nm to about 500 nm, about 10 nm to about 50 nm, about 10 nm to about 100 nm, about 10 nm to about 150 nm, about 10 nm to about 200 nm, about 10 nm to about 250 nm, about 10 nm to about 300 nm, about 10 nm to about 350 nm, about 10 nm to about 400 nm and about 10 nm to about 450 nm. In one embodiment, the average particle size of the nano-sized silica particles may be selected from the range of about 10 nm to about 500 nm.

The particle size of the nano-sized silica particles may be controlled by controlling the nucleation number, which is in turn controlled by the process kinetics and temperature. As will be mentioned further below, as the nano-sized silica particles are being formed, the silica particles are subjected to an agitating step. The agitating step aids in substantially preventing the aggregation of the nano-sized silica particles such that they stay in the nano-scale and do not form micro-particles. The nano-sized silica particles may also be stabilized due to the linkage with the polymer matrix.

The wt % of the nano-sized silica particles present in the nano-composite may be selected from the range consisting of about 0.1 wt % to about 10 wt %, about 1 wt % to about 10 wt %, about 2 wt % to about 10 wt %, about 3 wt % to about 10 wt %, about 4 wt % to about 10 wt %, about 5 wt % to about 10 wt %, about 6 wt % to about 10 wt %, about 7 wt % to about 10 wt %, about 8 wt % to about 10 wt %, about 9 wt % to about 10 wt %, about 0.1 wt % to about 1 wt %, about 0.1 wt % to about 2 wt %, about 0.1 wt % to about 3 wt %, about 0.1 wt % to about 4 wt %, about 0.1 wt % to about 5 wt %, about 0.1 wt % to about 6 wt %, about 0.1 wt % to about 7 wt %, about 0.1 wt % to about 8 wt % and about 0.1 wt % to about 9 wt %, based on the weight of the nano-composite. In one embodiment, the wt % of the nano-sized silica particles may be selected from the range of about 0.1 wt % to about 10 wt %.

While the mechanical properties of the resultant nano-composite generally improve as the weight percentage of the nano-sized silica particles present in the nano-composite increases, the improvement in the mechanical properties of the nano-composite is also dependent on the extent of cross-linking between the polymer matrix and the nano-sized silica particles. If the weight percentage of the nano-sized silica particles is too high, the nano-sized silica particles may prevent each other from cross-linking with the polymer matrix such that the nano-sized silica particles become poorly dispersed in the polymer matrix ("overcrowding effect"). When this happens, the mechanical properties of the nano-composite may decrease. Accordingly, the weight percentage of the nano-sized silica particles may be less than 4 wt % to avoid any substantial loss in the mechanical properties of the nano-composite due to "overcrowding" effects. This is applicable for structural applications which require high strength and light-weight materials such as in the automotive, aerospace and windmill industries.

The weight percentage and particle size of the nano-sized silica particles present in the nano-composite may be dependent on the amount of silicon alkoxide and catalyst used. The weight ratio of epoxy resin to silicon alkoxide is from 2:1 to 220:1. The nano-sized silica particles may have an elongated shape with an aspect ratio (that is, the ratio of the length to the width of the nano-sized silica particle) in the range of more than 1 to about 5. This is in comparison to the nano-sized silica particles of the prior art which tend to be spherical in shape. The elongated or oblong shape of the disclosed nano-sized silica particles may be due to the stretching of the nano-sized silica particles as they are being formed in a shear environment. The shear environment may be a high shear environment. The high shear may be generated as the reaction mixture is subjected to agitation such as vigorous stirring in a reaction vessel, leading to the creation of turbulent conditions in the reaction vessel. For a stirred vessel, the Reynolds number is defined by the following equation:

$$Re = \frac{\rho ND^2}{\mu}.$$

where Re is the Reynolds number, p is the density of the reaction mixture (kg/m$^3$), N is the rotational speed of the stirrer in the reaction vessel (revolutions per second), D is the diameter of the stirrer (m) and µ is the dynamic viscosity of the fluid (Pa·s).

For turbulent flow, the Reynolds number is greater than 10,000.

Hence, the method may comprise the step of agitating the nano-sized silica particles during formation to impart a shear force therein. The agitating step may take place before the curing step.

The polymerizable resin may comprise a thermosetting polymer. The thermosetting polymer may comprise an epoxy matrix material. The epoxy matrix material may be an epoxy-containing monomer, oligomer, polymer or any combination thereof.

The epoxy matrix material may also be of the bisphenol A type epoxy resin, bisphenol S type epoxy resin, bisphenol K type epoxy resin, bisphenol F type epoxy resin, phenolic novolak type epoxy resin, cresol novolak type epoxy resin, alicyclic epoxy resin, heterocyclic epoxy resins (such as triglycidyl isocyanuric and hydantoin epoxy), hydrogenated bisphenol A type epoxy resin and aliphatic epoxy resins (such as propylene glycol-diglycidyl ether and pentaerythritolpolyglycidyl ether).

The epoxy matrix material may also be obtained by the reaction between an aromatic, aliphatic or alicyclic carboxylic acid and epichlorohydrin. The epoxy matrix material may have a spiro ring, a glycidyl ether type epoxy resin which is obtained by the reaction between ortho-allyl phenolic novolak compound and epichlorohydrin. The epoxy matrix material may be of a glycidyl ether type epoxy resin which is obtained by the reaction between diallyl bisphenol compound having an allyl group in the ortho site of bisphenol A with respect to the hydroxyl group and epichlorohydrin. The epoxy matrix material may be obtained by the reaction between a phenol and an epichlorohydrin in which the reactants may be bisphenols (such as bisphenol A and bisphenol F), resorcinol, dihydroxynaphthalene, trihydroxynaphthalene, dihydroxybiphenylfluorene, trishydroxylmethane, tetrakishydroxphenlylethane, novolaks, condensates of dicyclopentadiene and phenols. The epoxy matrix material may be obtained by the reaction between amines and epichlorohydrin in which the reactants may be tetraglycidyldiaminodiphenylmethane, aminophenol, aminocresol and xylenediamine. In addition, derivatives such as ethylene oxide, propylene oxide, styrene oxide, cyclohexene oxide and phenyl glycidyl ether may be used as desired. These epoxy matrix materials can be used singly or in the form of a mixture of at least two kinds of the epoxy resins.

The epoxy matrix material may be present in the mixture based on a weight ratio of epoxy matrix material to silica from 6:1 to 610:1.

In one embodiment, the epoxy matrix material may be an aliphatic, cycloaliphatic or aromatic epoxy resin which has a plurality of epoxide groups. The epoxy resin may have two epoxide groups such as diglycidyl ether of bisphenol A (DER™ 332, by Dow), represented by formula (III).

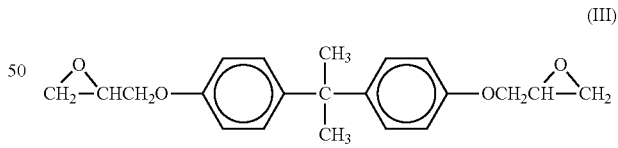

The curing agent may be used for solidifying or curing the polymerizable resin. Hence, the method may comprise the step of curing the substantially homogeneous mixture to form a solidified nano-composite. The curing step may be undertaken after the nano-sized silica particles are formed. The nano-composite may be silica-epoxy nano-composite.

The curing agent may be a phenolic compound, an amine compound, an imide compound, an amide compound, a barbituric acid derivative, a cyanuric acid derivative, a thio phenolic compound, or a carboxylic acid compound.

The phenolic compound may be selected from the group consisting of phenol, cresol, resorcinol, o-cresol, m-cresol, p-cresol, chlorophenol, nitrophenol, bromophenol, dinitrophenol, hydroquinone, pyrocatechol, pyrogallol, hydroxyhydroquinone, 2-methoxyphenol, 2,5-dichlorophenol, 3-acetoxyphenol, m-aminophenol, p-aminophenol, 4,4'-dihydroxydiphenylpropane, 4,4'-dihydroxydiphenylmethane, 3,3'-dihydroxydiphenylpropane, 4,4'-dihydroxy diphenyl ether, 4,4'-dihydroxydiphenylethane, 4,4'-dihydroxy diphenyl ketone, 2-allylphenol and 2-allylcresol. It is also possible to use phenol derivatives which are obtained by the reaction between the phenolic compounds exemplified above and various aldehyde compounds such as formalin and acetaldehyde. These phenolic compounds can be used singly or in the form of a mixture of at least two kinds of phenolic compounds.

The amine compound may be selected from the group consisting of dialkyltoluenediamine, phenylenediamine, diaminodiphenylmethane, diaminodiphenyl ether, diaminodiphenyl sulfone (such as 4,4'-diaminodiphenylsulfone), diaminodiphenyl sulfide, aminophenylalkylaniline (such as 4-[(4-aminophenyl)methyl]aniline), an aromatic amine compound comprising a halogen-substituted derivative or an alkyl-substituted derivative of the compounds mentioned above, an amine compound obtained by the reaction between aniline or an aniline derivative and an aldehyde compound, and an amino phenol derivative having both a hydroxyl group and an amino group in a molecule. These amine compounds can be used singly or in the form of a mixture of at least two amine compounds.

In one embodiment, the dialkyltoluenediamine may be dipropyltoluenediamine or diethyltoluenediamine having a formula (IV):

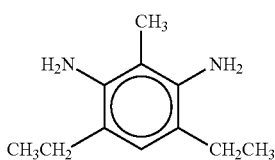

(IV)

The curing agent may be added to the mixture before or after the addition of the alkaline catalyst. In the curing step, the substantially homogeneous mixture (after being aged) may be degassed at a temperature of about 70° C. to about 80° C., or about 75° C., and then cured in an oven. The oven may be an air purged oven. The curing step may be undertaken at a series of curing temperatures and curing times. In one embodiment, the curing step may require the use of three curing temperatures, each carried out for a defined amount of time. The first curing temperature may be selected from the range of about 100° C. to about 150° C. for a curing time of about 30 minutes to about 90 minutes. The second curing temperature may be selected from the range of about 150° C. to about 250° C. for a curing time of about 90 minutes to about 150 minutes. The third curing temperature may be selected from the range of about 250° C. to about 30° C. for a curing time of about 3 hours to about 5 hours. Accordingly, the first curing temperature may be about 130° C. for 1 hour, the second curing temperature may be about 170° C. for 2 hours and the third curing temperature may be about 270° C. for 4 hours.

The addition of the curing agent solidifies or cures the polymerizable resin such that a nano-composite is formed. The nano-composite may have higher flexural strength and/or flexural modulus compared to a nano-composite which does not have the disclosed nano-sized silica particles therein. The nano-sized silica particles may be uniformly mono-dispersed within the matrix.

The nano-composite may be prepared by the method disclosed herein. The nano-composite may comprise nano-sized silica particles uniformly dispersed within the matrix, wherein the nano-sized silica particles are present in an amount less than about 6%, less than about 5%, less than about 4%, less than about 3%, less than about 2%, or less than about 1%, by weight of the nano-composite. The nano-sized silica particles present in the nano-composite may have aspect ratios of greater than about 1, greater than about 2, greater than about 3, greater than about 4. The aspect ratio may be in the range of more than 1 to about 5. In one embodiment, the aspect ratio may be in the range of about 1.5 to about 5.

The nano-composite may be used to coat a fiber. Hence, there is provided a method of preparing a fiber coated with a nano-composite, the method comprising the steps of: forming a mixture containing a silica precursor; a polymerizable resin; a coupling agent capable of coupling the silica to the matrix; and a catalyst for catalysing the formation of hydrolyzed nano-sized silica particles and functionalizing the nano-sized silica particles to enable the nano-sized silica particles to be uniformly dispersed within the matrix to thereby form the nano-composite; and coating the nano-composite onto the fiber, wherein the mixture is substantially free of an alcoholic solvent.

The method may comprise the step of adding a curing agent to the mixture for solidifying the matrix. Exemplary curing agents have been mentioned above.

The method may further comprise the step of agitating the mixture to impart a shearing force therein. The agitating step may be undertaken as the nano-sized silica particles are being formed.

The method may further comprise the step of curing the nano-composite to form a solidified nano-composite. The curing step may be undertaken after the nano-sized silica particles are formed.

The method may be carried out under conditions substantially free from alcoholic solvents.

There is also provided a mixture for forming a nano-composite. The mixture comprises a silica precursor; a polymerizable resin; a coupling agent capable of coupling the silica to the matrix; and a catalyst for catalysing the formation of hydrolyzed nano-sized silica particles and functionalizing said nano-sized silica particles to enable the nano-sized silica particles to be uniformly dispersed within said matrix to thereby form the nano-composite.

The weight ratio of epoxy matrix material to hardener may be about 3:1 to 4:1. The weight ratio of epoxy matrix material to silicon alkoxide may be selected from the range of 5:1 to 22:1. The weight ratio of silicon alkoxide to ammonia molecules may be about 5.7:1 to 7.7:1. The weight ratio of silicon alkoxide to water may be about 1.9:1 to 2.5:1. The weight ratio of silicon alkoxide to silane coupling agent may be about 7:1 to 34700:1.

When forming the nano-sized silica particles, the mixture may be maintained at a temperature in the range selected from the group consisting of about 20° C. to about 60° C., about 25° C. to about 60° C., about 30° C. to about 60° C., about 35° C. to about 60° C., about 40° C. to about 60° C., about 45° C. to about 60° C., about 50° C. to about 60° C., about 55° C. to about 60° C., about 20° C. to about 25° C., about 20° C. to about 30° C., about 20° C. to about 35° C., about 20° C. to about 40° C., about 20° C. to about 45° C., about 20° C. to about 50° C., and about 20° C. to about 55° C. In one embodiment, the temperature is about 50° C. The temperature may be chosen to allow the mixture to be stirred easily because the polymerizable resin may be more viscous at a higher temperature. In another embodiment, the temperature may be about 25° C. (or room temperature).

The mixture may also be agitated or stirred during formation of the nano-sized silica particles. The stirring may be undertaken vigorously such that a shear environment is created. The shear environment may be a high shear environment.

After the agitating step, the mixture may be subjected to an ageing step for about 30 minutes to about 2 hours. In one embodiment, the ageing time is about 1 hour.

After the ageing step, the mixture may be cured. In the curing step, the mixture may be degassed at a temperature of about 70° C. to about 80° C., or about 75° C., and then cured in an oven. The oven may be an air purged oven. The curing step may be undertaken at a series of curing temperatures and curing times, as mentioned above.

There is also provided a kit for forming a nano-composite. The kit comprises a silica precursor; a polymerizable resin; a coupling agent capable of coupling the silica to the matrix; and a catalyst for catalysing the formation of hydrolyzed nano-sized silica particles and functionalizing said nano-sized silica particles to enable the nano-sized silica particles to be uniformly dispersed within said matrix to thereby form the nano-composite; and instructions to prepare the nano-composite.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

EXAMPLES

Figure 1:
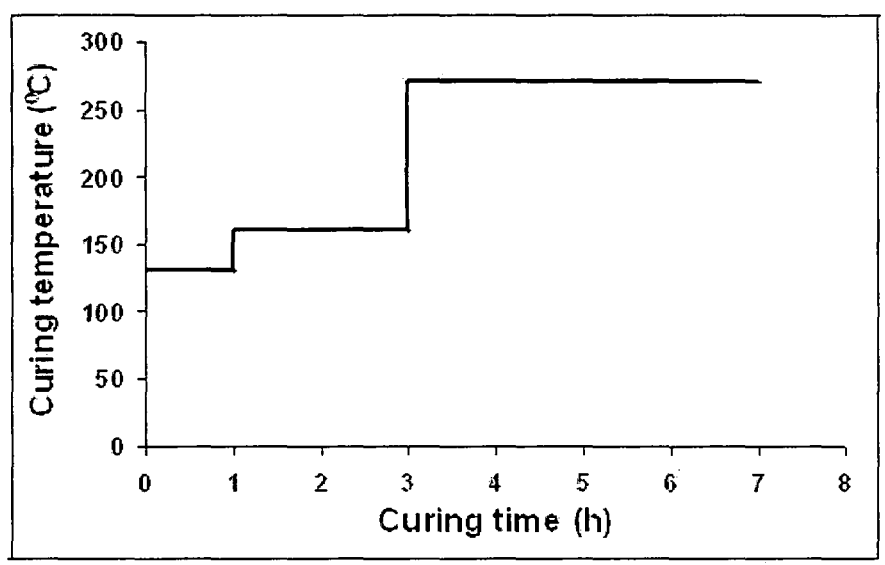
FIG. 1 is a graph showing the curing process of the silica/epoxy nano-composite in accordance to one embodiment disclosed herein.

Non-limiting examples of the invention, including comparative examples will be further described in greater detail by reference to specific Examples, which should not be construed as in any way limiting the scope of the invention.

Example 1

Solvent-Free One-Pot Synthesis of Aminated-Silica/Epoxy Nano-Composite (1 wt-% Nano-Sized Silica Particles)

Glycidyl ether of bisphenol A (D.E.R.™ 332, DOW), diethyltoluenediamine (Ethacure 100-LC, Albemarle), tetraethylorthosilicate (TEOS), aminopropyltrimethoxysilane (APTMS) with a weight ratio of 3.8:1:0.17:0.005 were mixed under vigorous stirring at 50° C. for 5 minutes Ammonia solution (25 wt-% $NH_3$ solution, 1:1.6 volume ratio of $NH_3$ solution:TEOS) was injected in the above solution and aged for 1 hour at 50° C. The mixture was degassed at 75° C. before it was poured into a releasing agent-coated mold and cured in an air purged oven with the curing temperatures and periods shown in FIG. 1 to form a uniformly mono-dispersed silica/epoxy nano-composite which is similar to that shown in FIG. 2.

Example 2

Solvent-Free One-Pot Synthesis of Aminated-Silica/Epoxy Nano-Composite (2 wt-% Nano-Sized Silica Particles)

Glycidyl ether of bisphenol A (D.E.R.™ 332, DOW), diethyltoluenediamine (Ethacure 100-LC, Albemarle), tetraethylorthosilicate (TEOS), aminopropyltrimethoxysilane (APTMS) with a weight ratio of 3.8:1:0.33:0.01 were mixed under vigorous stirring at 50° C. for 5 minutes Ammonia solution (25 wt-% $NH_3$ solution, 1:1.6 volume ratio of $NH_3$ solution:TEOS) was injected in the above solution and aged for 1 hour at 50° C. The mixture was degassed at 75° C. before it was poured into a releasing agent-coated mold and cured in an air purged oven with with the curing temperatures and periods shown in FIG. 1 to form a uniformly mono-dispersed silica/epoxy nano-composite which is similar to that shown in FIG. 2.

Example 3

Solvent-Free One-Pot Synthesis of Aminated-Silica/Epoxy Nano-Composite (3 wt-% Nano-Sized Silica Particles)

Glycidyl ether of bisphenol A (D.E.R.™ 332, DOW), diethyltoluenediamine (Ethacure 100-LC, Albemarle), tetraethylorthosilicate (TEOS), aminopropyltrimethoxysilane (APTMS) with a weight ratio of 3.8:1:0.5:0.014 were mixed under vigorous stirring at 50° C. for 5 minutes Ammonia solution (25 wt-% $NH_3$ solution, 1:1.6 volume ratio of $NH_3$ solution:TEOS) was injected in the above solution and aged for 1 hour at 50° C. The mixture was degassed at 75° C. before it was poured into the releasing agent-coated mold and cured in an air purged oven with the curing temperatures and periods shown in FIG. 1 to form a uniformly mono-dispersed silica/epoxy nano-composite which is similar to that shown in FIG. 2.

Example 4

Solvent-Free One-Pot Synthesis of Aminated-Silica/Epoxy Nano-Composite (4 wt-% Nano-Sized Silica Particles)

Glycidyl ether of bisphenol A (D.E.R.™ 332, DOW), diethyltoluenediamine (Ethacure 100-LC, Albemarle), tetraethylorthosilicate (TEOS), aminopropyltrimethoxysilane (APTMS) with a weight ratio of 3.8:1:0.66:0.02 were mixed under vigorous stirring at 50° C. for 5 minutes Ammonia solution (25 wt-% $NH_3$ solution, 1:1.6 volume ratio of $NH_3$ solution:TEOS) was injected in the above solution and aged for 1 hour at 50° C. The mixture was degassed at 75° C. before it was poured into the releasing agent-coated mold and cured in an air purged oven with the curing temperatures and periods shown in FIG. 1 to form a uniformly mono-dispersed silica/epoxy nano-composite which is similar to that shown in FIG. 2.

Comparative Example 1

Preparation of Neat Epoxy Sample for Comparison Purposes

Glycidyl ether of bisphenol A (D.E.R.™ 332, DOW) and diethyltoluenediamine (Ethacure 100-LC, Albemarle) were mixed together at 3.8:1 weight ratio of epoxy:curing agent for 5 minutes. The solution was degassed under vacuum at 75° C. prior to pouring into a releasing agent-coated mold and cured in an air purged oven with the curing temperatures and periods shown in FIG. 1.

Comparative Example 2

Solvent-Free One-Pot Synthesis of Non-Functionalized Silica/Epoxy Nano-Composite (2 wt-% Nano-Sized Silica Particles) for Comparison Purposes Glycidyl ether of bisphenol A (D.E.R.™ 332, DOW), diethyltoluenediamine (Ethacure 100-LC, Albemarle) and tetraethylorthosilicate (TEOS) with a weight ratio of 3.8:1:0.33 were mixed under vigorous stirring at 50° C. for 5 minutes Ammonia solution (25 wt-% $NH_3$ solution, 1:1.6 volume ratio of $NH_3$ solution:TEOS) was injected in the above solution and aged for 1 h. The mixture was degassed at 75° C. prior to pouring into a releasing agent-coated mold and cured in an air purged oven with the curing temperatures and periods shown in FIG. 1 to form a uniformly mono-dispersed silica/epoxy nano-composite.

Comparative Example 3

Figure 2:
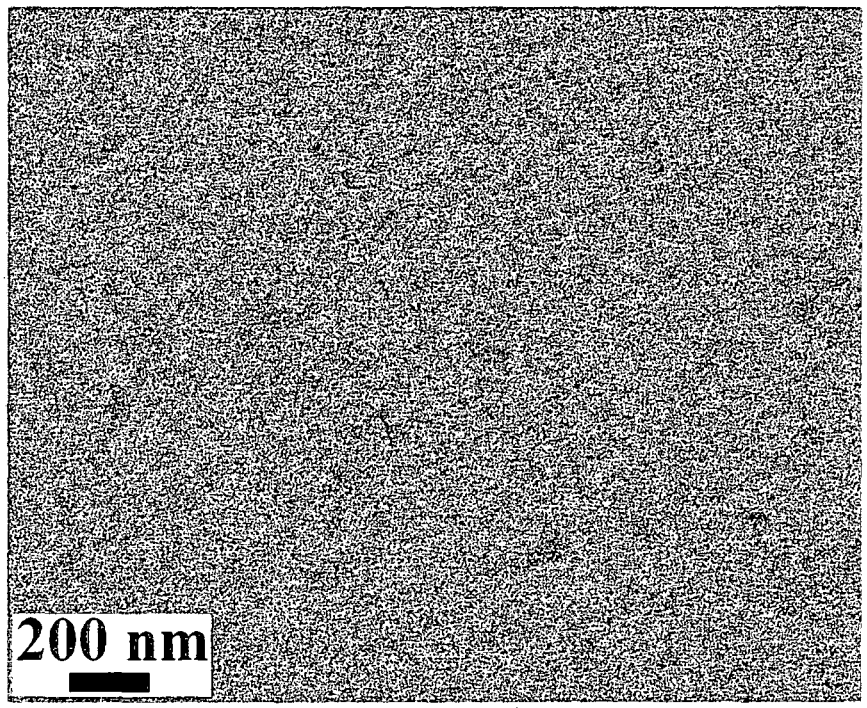
FIG. 2 is a Transmission Electron Microscopy (TEM) image showing highly dispersed nano-sized silica particles in epoxy matrix in accordance to one embodiment disclosed herein.

Preparation of Silica/Epoxy Nano-Composite from Commercial Silica/Epoxy (Nanopox F-400, 2 wt-% Nano-Sized Silica Particles) for Comparison Purposes Glycidyl ether of bisphenol A (D.E.R.™ 332, DOW), diethyltoluenediamine (Ethacure 100-LC, Albemarle) and Nanopox F-400 with a weight ratio of 3.6:1:0.24 were mixed for 5 minutes and degassed at 75° C. prior to pouring into a releasing agent-coated mold and cured in an air purged oven with the curing temperatures and periods shown in FIG. 1.

Analytical Methods i) Thermal Properties

A. Single-cantilever mode of the dynamic mechanical analyzer (DMA Q800, TA Instruments) was used to measure dynamic modulus and glass transition temperature (Tg) of material at a frequency of 1 Hz, heating rate 3° C./min to 300° C. and oscillation amplitude of 20 μm.

B. Thermogravimetric analysis (TGA) was performed with a thermogravimetric analyzer (TA instrument Q500) at a heating rate of 5° C./min to 800° C. under nitrogen atmosphere to obtain degradation temperature (Td) of materials.

ii) Mechanical Properties

A. Flexural strength and modulus were determined by 3-point bending test according to the ASTM Standard D 790-96, with specimens of width 13 mm, length 55 mm and thickness 2.2 mm. The tests were conducted with crosshead speed of 1 mm/min, at a span length of 40 mm.

B. Tensile strength and modulus were determined using tensile tests carried out according to the ASTM Standard D 638-03 using the Instron 5569 testing machine at tensile speed of 1 mm/min. The specimens were cut into dog-bone shape of width 3 mm, length 55 mm and thickness 2.2 mm.

C. Mode I fracture toughness was determined using single edge notched bending (SENB) tests measured in term of critical stress intensity factor (KIc), according to ASTM Standard D 5528-01. Samples were tested to failure at a crosshead speed of 1 mm/min.

Using these analytical methods, characterization of the materials obtained from the above examples were carried out. Table 1 below summarizes characterization results of silica/epoxy nano-composite produced from the above-mentioned examples. Silica/epoxy nano-composite with good mechanical properties and high thermal stability are proven to be conveniently prepared by embodiments of the present disclosure, where 6, 20, 17 and 49% improvements in dynamic modulus, flexural modulus, tensile modulus and fracture toughness respectively are achieved when neat epoxy is substituted by 3 wt-% in situ synthesized silica/epoxy nano-composite.

TABLE 1

| Properties | Examples 1 to 4[a] | | | | Comparative examples 1 to 3 | | |
|---|---|---|---|---|---|---|---|
| | 1 wt-% silca | 2 wt-% silica | 3 wt-% silica | 4 wt-% silica | Neat epoxy | 2 wt-% non-functionalized silica | 2 wt-% commercial silica |
| Viscosity (mPa · s) | 3300 | 5000 | 7000 | — | 2000 | 4600 | 3000 |
| Storage modulus (MPa) | 2550 | 2510 | 2670 | 2730 | 2512 | 2330 | 2370 |
| Glass transition temperature ($T_g$, ° C.) | 200 | 210 | 185 | 161 | 210 | 207 | 209 |
| Degradation temperature ($T_d$, ° C.) | 370 | 376 | 374 | — | 375 | 372 | 374 |
| Flexural strength (MPa) | 107 | 88 | 116 | 94 | 79 | 80 | 126 |
| Flexural modulus (GPa) | 2.6 | 2.8 | 3.0 | 2.8 | 2.4 | 2.5 | 1.8 |
| Tensile strength (MPa) | 40 | 55 | 61 | 60 | 60 | 49 | 66 |
| Tensile modulus (GPa) | 2.5 | 2.6 | 3.0 | 2.9 | 2.5 | 2.7 | 2.2 |
| Fracture toughness ($K_{Ic}$, MPa · $m^{1/2}$) | 0.36 | 0.54 | 0.68 | 0.76 | 0.35 | 0.40 | 0.55 |

[a]Aminated silica/epoxy nano-composites synthesized by solvent-free one-pot synthesis.

DETAILED DESCRIPTION OF FIGURES

Figure 3:
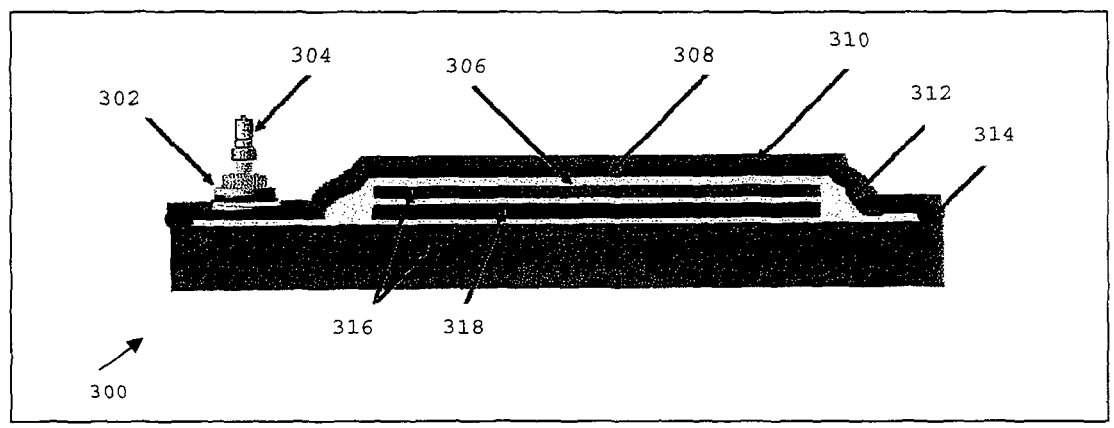
FIG. 3 is a schematic illustration of a vacuum bagging set up for the fiber-reinforced silica/epoxy nano-composite in accordance to one embodiment disclosed herein.

Referring to FIG. 3, there is provided a schematic illustration of a vacuum bagging set up 300 for producing fiber-reinforced silica/epoxy nano-composite 318 in accordance to one embodiment disclosed herein. The vacuum bagging set up 300 comprises a vacuum bag connecter 302 coupled to a quick disconnect plug 304 which is capable of attaching to a vacuum source. Two aluminum plates 316 are used to sandwich the fiber-reinforced nano-composite 318. The top aluminum plate is arranged so that it is sealed in the space between a bagging film 310 and the lower aluminum plate. A sealant tape 314 is used to seal the bagging film 310 and the lower aluminum plate together. A release film 306 is also disposed between a breather layer and the top aluminum plate. The release film 306 serves to prevent the resin from being permanently coated onto the aluminum plate. The breather layer serves to absorb any excess resin that may be squeezed out from the laminated material during vacuum and press. A pressure sensitive tape 312 is also present on the bagging film to adhere the release film 306 into the aluminum plate and also to prevent the resin from being permanently coated onto the aluminum plate.

To produce a fiber reinforced silica/epoxy nano-composite, glycidyl ether of bisphenol A (D.E.R.™ 332, DOW), diethyltoluenediamine (Ethacure 100-LC, Albemarle), tetraethylorthosilicate (TEOS), aminopropyltrimethoxysilane (APTMS) with the desired weight ratio for example as discussed in Examples 1-4 were mixed under vigorous stirring at 50° C. for 5 minutes Ammonia solution (25 wt-% $NH_3$ solution, 1:1.6 volume ratio of $NH_3$ solution:TEOS) was then injected in the above solution and aged for 1 hour. The mixture was degassed at 75° C. before it was used is laminated onto a woven carbon fiber (TORAYCA T300, TORAY) using the setup shown in FIG. 3. The vacuum bagging technique shown in FIG. 3. is used to seal the laminated material prior to curing at desirable temperatures while pressing under vacuum. Subsequently, after the laminated material has been sealed, the fiber reinforced nano-composite is cured at the curing temperatures and periods shown in FIG. 1.

APPLICATIONS

The present method is a simple yet effective way of producing nano-composite materials that have superior mechanical strength. In particular, the present method is capable of effectively producing silica epoxy nano-composite materials that have superior mechanical and thermal properties as compared to neat epoxy.

Furthermore, as the present method does not require the use of solvents, especially alcoholic solvents, there is no need for the additional step of solvent removal. As such, additional expenses incurred from the costs of the solvent as well as from the disposal can be avoided, making the method costs effective. Accordingly, due to method being economically favourable, the nano-composite materials produced can be extended to many applications and not only limited to high tech applications such as aerospace, automotive and electronics.

In addition, the interfacial interaction between the nano-sized silica particles and the matrix of the nano-composite materials produced by the method is strong, resulting in enhanced mechanical and thermal properties. As a result, nano-composite materials with low silica content of less than 6% can be achieved without unnecessarily compromising on the desired mechanical and thermal properties. Also, as less silica can be present in these nano-composite materials without loss of the desired mechanical and thermal properties, the disclosed nano-composite material prior to curing may have reasonably low viscosity as compared to composite materials with more than 6% silica. Advantageously, these nano-composite materials can be fed into cavities of designed mold shape with relative ease before curing, favouring production on an industrial scale.

The disclosed nano-composite can be used to coat a fiber for carbon fiber reinformcement. Hence, the fiber can be used in the field of structural components, adhesive and coating materials of automotive, aerospace, submarine, military, electronic, sporting good and energy industries.

The disclosed nano-composite can be used in resin transfer moulding by choosing an epoxy matrix material that has low viscosity such that the resultant nano-composite has a low viscosity (less than 1500 mPa·s).

While reasonable efforts have been employed to describe equivalent embodiments of the present invention, it will be apparent to the person skilled in the art after reading the foregoing disclosure, that various other modifications and adaptations of the invention may be made therein without departing from the spirit and scope of the invention and it is intended that all such modifications and adaptations come within the scope of the appended claims.

The invention claimed is:

1. A method of making a nano-composite having individual nano-sized silica particles dispersed in a polymer matrix which comprises steps of:
   providing a substantially homogeneous mixture which comprises silica precursors; a polymerizable resin; a coupling agent having functional groups; a curing agent and an alkaline catalyst; and
   hydrolyzing and condensing said silica precursors in said substantially homogeneous mixture, wherein the alkaline catalyst is selected to initiate hydrolysis and condensation of the silica precursors to form the silica particles while simultaneously functionalizing the formed silica particles with the functional groups of the coupling agent, said hydrolyzing, condensing and functionalizing being undertaken under shear conditions and in the absence of an alcoholic solvent in said homogeneous mixture to form individual nano-sized silica particles dispersed in said polymerizable resin.

2. The method of claim 1, further comprising the step of curing the substantially homogeneous mixture containing the nano-sized silica particles to form a solidified nano-composite.

3. The method of claim 1, wherein said silica particles are functionalized with amine groups or epoxide groups.

4. The method of claim 1, wherein said coupling agent is an organo-silane coupling agent having amine functional groups and alkoxy functional groups.

5. The method of claim 4, further comprising the step of hydrolyzing said coupling agent to form a hydrolyzed organo-silane coupling agent having amine functional groups and hydroxyl functional groups.

6. The method of claim 1, wherein the silica precursors comprise silicon alkoxides of the following formula $Si(OR)_n$, in which R is an $C_{1-6}$ alkyl group and n is 4.

7. The method of claim 6, wherein said silicon alkoxides hydrolyze to form silicon hydroxides.

8. The method of claim 7, wherein said silicon hydroxides condense to form hydrolyzed silica particles.

9. The method of claim 8, wherein the functional groups of the coupling agent condense with the hydroxyl groups on the surface of the hydrolyzed silica particles.

10. The method of claim 1, wherein said shear conditions are generated by agitating said substantially homogeneous mixture.

11. The method of claim 1, wherein the polymerizable resin comprises a thermosetting polymer.

12. The method of claim 11, wherein the thermosetting polymer comprises an epoxy polymer.

13. The method of claim 12, wherein the epoxy polymer comprises a plurality of epoxide groups.

14. The method of claim 1, wherein the nano-sized silica particles are in an amount of from about 0.1 to about 10% by weight of the nano-composite.

15. The method of claim 1, wherein the nano-sized silica particles have an average particle size ranging from about 10 to about 500 nm.

16. The method of claim 1, wherein the alkaline catalyst is selected from the group consisting of ammonia, ammonium hydroxide solution and an alkylamine.

17. A nano-composite comprising nano-sized silica particles dispersed in a polymer matrix made according to the method of claim 1, wherein the nano-sized silica particles are substantially elongate.

18. The nano-composite as claimed in claim 17, wherein the aspect ratio of the nano-sized silica particles is greater than about 1.

19. The nano-composite as claimed in claim 17, wherein the nano-sized silica particles are present in the nano-composite in an amount less than about 6% by weight of the nano-composite.

* * * * *